(12) United States Patent
Selig

(10) Patent No.: US 8,370,766 B2
(45) Date of Patent: Feb. 5, 2013

(54) MENU CREATION BROWSER EXTENSION

(75) Inventor: Roy A. Selig, Hillsborough, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 923 days.

(21) Appl. No.: 11/980,144

(22) Filed: Oct. 30, 2007

(65) Prior Publication Data

US 2008/0184141 A1    Jul. 31, 2008

Related U.S. Application Data

(60) Provisional application No. 60/898,294, filed on Jan. 30, 2007.

(51) Int. Cl.
*G06F 3/048* (2006.01)

(52) U.S. Cl. ........ 715/810; 715/826; 715/733; 715/738; 715/744

(58) Field of Classification Search .................. 715/826, 715/733, 738, 744, 747
See application file for complete search history.

(56) References Cited

U.S. PATENT DOCUMENTS

| | | |
|---|---|---|
| 6,272,493 B1 | 8/2001 | Pasquali |
| 6,321,209 B1 | 11/2001 | Pasquali |
| 6,434,563 B1 | 8/2002 | Pasquali et al. |
| 6,535,882 B2 | 3/2003 | Pasquali |
| 6,636,856 B2 | 10/2003 | Pasquali |
| 6,658,419 B2 | 12/2003 | Pasquali |
| 6,918,066 B2 | 7/2005 | Dutta et al. |
| 7,085,736 B2 | 8/2006 | Keezer et al. |
| 7,089,237 B2 | 8/2006 | Turnbull et al. |
| 7,107,264 B2 | 9/2006 | Lu |
| 7,380,202 B1 * | 5/2008 | Lindhorst et al. ............. 715/204 |
| 2003/0120599 A1 * | 6/2003 | Agboatwalla et al. .......... 705/50 |
| 2003/0233425 A1 * | 12/2003 | Lyons et al. .................. 709/217 |
| 2004/0165007 A1 | 8/2004 | Shafron |
| 2004/0205633 A1 | 10/2004 | Martinez et al. |
| 2005/0039144 A1 | 2/2005 | Wada et al. |
| 2005/0192771 A1 * | 9/2005 | Fischer et al. ................ 702/122 |
| 2006/0059434 A1 | 3/2006 | Boss et al. |
| 2006/0069617 A1 | 3/2006 | Milener et al. |
| 2006/0143568 A1 | 6/2006 | Milener et al. |
| 2006/0179404 A1 | 8/2006 | Yolleck et al. |
| 2006/0184578 A1 | 8/2006 | La Rotonda et al. |
| 2006/0184997 A1 | 8/2006 | La Rotonda et al. |
| 2006/0212790 A1 * | 9/2006 | Perantatos et al. ......... 715/501.1 |
| 2006/0224951 A1 | 10/2006 | Burke et al. |
| 2007/0101298 A1 | 5/2007 | Yolleck et al. |
| 2007/0156582 A1 * | 7/2007 | Bagheri ......................... 705/40 |

OTHER PUBLICATIONS

Linkycat, "Take a look at the interface of LinkyCat" (2006) http://linkycat.com/features/; pp. 1-9.*
Wikipedia; Dashboard (software); www.en.wikipedia.com; Apr. 29, 2005; pp. 1-7.

(Continued)

*Primary Examiner* — Andrey Belousov
*Assistant Examiner* — Di Xiao
(74) *Attorney, Agent, or Firm* — Kraguljac Law Group, LLC

(57) ABSTRACT

Methods and other embodiments associated with a browser extension that provides menu manipulation functionality are described. One example browser extension includes a drag logic to identity an item in a first frame, where the item is to be added to a menu in a second frame. The browser extension may also include a deposition logic to identify a location in the menu where the item is to be added. The browser extension may also include a menu logic to add a representation of the item to the menu in the second frame, to update a data structure with information concerning the updated menu, and to store information associated with the data structure in a fixed medium.

23 Claims, 10 Drawing Sheets

OTHER PUBLICATIONS

Wikipedia; Windows Sidebar; www.en.wikipedia.org; Nov. 8, 2006; pp. 1-3.
King, Brian; What is Firefox, Published on O'Reilly Network; http://www.oreillynet.com; Sep. 26, 2005; pp. 1-7.
Xulplanet; XUL Tutorial, Ch. 4.5: Content Panels (pp. 1-3) www.xulplanet.com/tutorials/xultu; Feb. 19, 2006.
Microsoft Corp.; Browse, Shop & Search Multiple Websites at Once; http://www.microsoft.com/windows/ie/ie7/tour/fre/tabs/how.html; Apr. 2007; p. 1.
Microsoft Corp.; Windows Help and How-To; Windows Vista Help: Using Quick Tabs in Internet Explorer; http://windowshelp.microsoft.com/04/2007; p. 1-2.

* cited by examiner

MENU CREATION BROWSER EXTENSION

CROSS REFERENCE TO RELATED APPLICATIONS

This application claims the benefit of U.S. Provisional Application Ser. No. 60/898,294 filed January 30, which is incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Conventional browsers may require the use of standalone tools to create menu systems for applications. This approach may be cumbersome and differ from a more natural and ubiquitous drag and drop experience. A natural drag and drop experience has typically not been available for browser-based menu creation due, at least in part, to operating system and/or browser restrictions on interactions between windows, frames, and so on.

A web browser extension is a code package that can be installed into a browser and/or client device (e.g., computer) running a browser. The extension may add a new feature to a browser, extend an existing functionality, modify a visual theme, allow previously restricted interactions, and so on. A browser may employ an extensible markup language (XML) user-interface language (XUL, pronounced zuul) to describe and support application user interfaces. XUL provides an overlay functionality that facilitates merging user interfaces from different sources into one user interface (UI). For example, UI from a browser and a browser extension(s) may be merged, which may facilitate previously restricted interactions. Recall that a browser extension may provide additional functionality for a browser. This functionality may include, for example, additional UI features that facilitate customizing a browser UI.

The collective UI adornment for a browser (e.g., border, menus, frames, buttons, scrollbars) may be referred to as "browser chrome" or just "chrome". A browser extension may interact with the browser chrome. A browser extension may include a XUL file(s), JavaScript, a style sheet(s), an image(s), and so on. This set of items may be loaded into a single package (e.g., Zip file). The package may be loaded into, unwrapped by, and installed on a client device associated with a browser. Once installed, package components may be operably connected to a browser and/or browser object(s) using the XUL overlay feature. Though added to a browser, browser extension code may remain separate and removable. An extension may reside in a browser and/or client device rather than being part of a web page transmitted by a web service (e.g., enterprise application) to the browser and/or client. Thus, conventional systems may employ functionality (e.g., XUL) to facilitate enhancing web browsers via web browser extensions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

In one embodiment, a browser extension is provided that provides a browser-based menu creation functionality. The browser extension may facilitate building a menu system within the context of a browser. The menu system may be created using a drag and drop functionality. In one example, a menu system may be built in a first frame. Menu entries may be dragged from a second frame (e.g., a related, embedded browser window) to the first frame. The drag and drop may be possible due to linkage between the two frames created and managed, at least in part, by a browser extension. The browser window in the second frame can be used to navigate to content (e.g., web pages) for which entries (e.g., links) are desired in the menu system. An identifier (e.g., icon, Uniform Resource Locator (URL)) may then be dragged from the second frame to a desired location on the first frame. Information may also be acquired from a browser-based URL repository associated with the second frame. For example, bookmark information, history information, and other URL repository information may be acquired from the second frame and used by the browser-based menu creation functionality in building the menu in the first frame. The browser extension may be embodied as software and delivered as part of an Enterprise Web Browser Extension or as part of a separate upload extension. Once installed on a client device, the browser extension may logically and/or physically become part of a browser and thus the upload functionality may become part of the browser functionality. This facilitates removing restrictions on interactions with conventional stand alone tools that may not include a browser-based drag and drop menu creation feature.

In one example, a browser-based menu creation tool is provided for actively building and organizing menuing systems in a browser through drag-and-drop operations. The menu creation tool facilitates assembling navigation content from disparate web sources into a structured menu system. In one embodiment, the menu creation tool facilitates aggregating content into a menu system for use in a web browser, or a browser extension like the Enterprise Web Browser Extension.

The menu creation tool can be embodied as software and delivered as a part of the Enterprise Web Browser Extension or as part of a separate extension. Once installed on a client device as a browser extension, the features become part of the browser. The menu creation tool may include additional functionality to facilitate, for example, content identification, co-location of content in a menu system, organization of content, and saving work.

Figure 1:
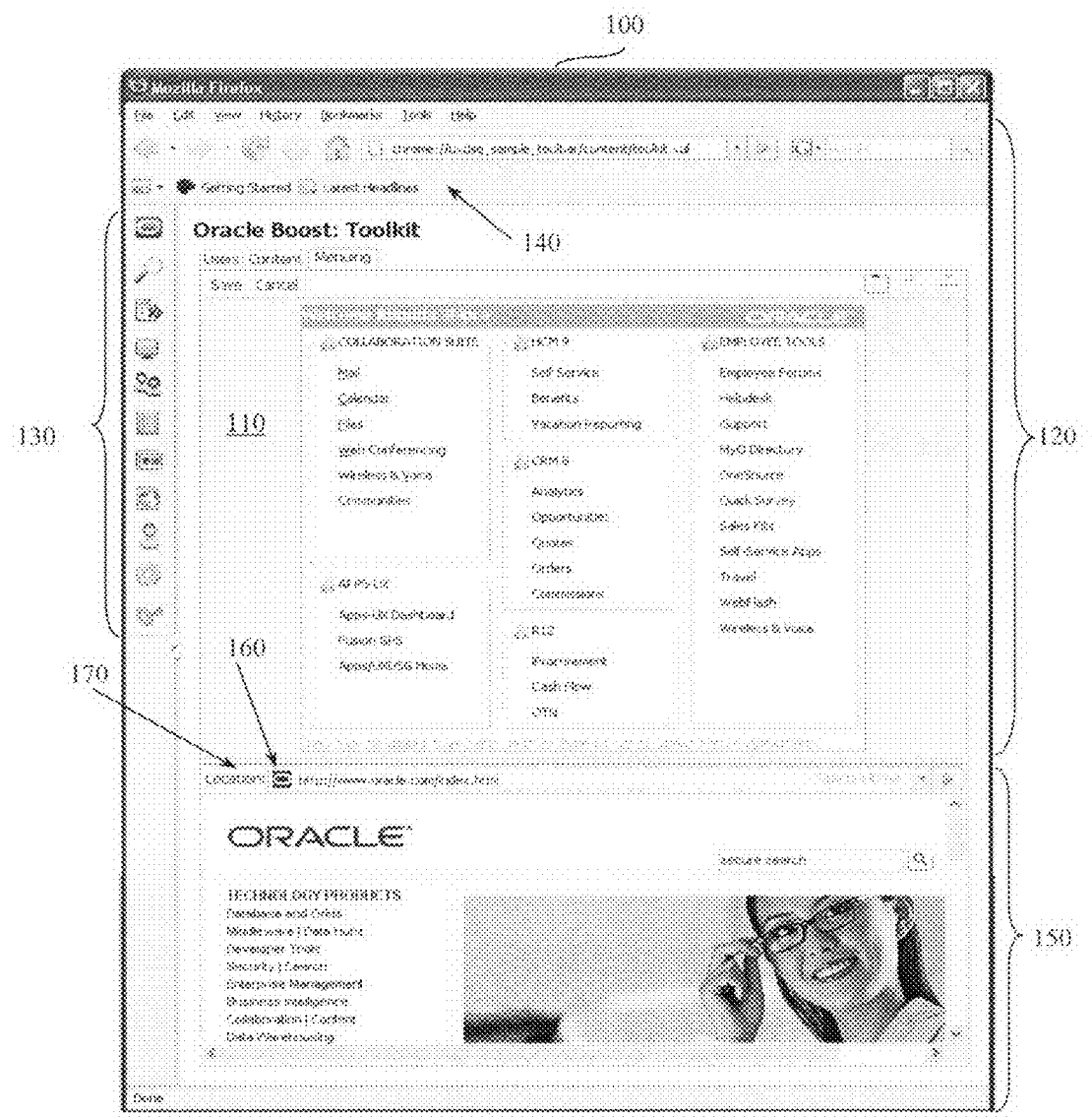
FIG. 1 is a simulated screen shot of a browser-based menu creation system provided, at least in part, by a browser extension.

FIG. 1 illustrates a simulated screen shot 100 of a browser-based menu creation system that is provided, at least in part, by a browser extension. Screen shot 100 illustrates a menu 110 being created. A representation of the menu 110 is displayed in a browser pane 120. The browser pane 120 may include a sidebar 130 and a toolbar 140 that may both be provided by a browser extension. Screen shot 100 also illustrates an embedded browser window 150 that appears connected to browser pane 120. Browser window 150 facilitates navigating to content to add to the menu 110. Rather than using a browse dialog or file system manager to identify entries to add to menu 110, browser window 150 facilitates navigating to potential menu entries. Since pane 120 and pane 150 are both associated with a browser extension associated with the menu creation tool, content (e.g., icon, URL) can be dragged from pane 150 to menu 110 in pane 120. Conventional stand alone menu systems may not have been operably connected to a browser extension and thus may not have had similar drag and drop capability where an item (e.g., URL) could be dragged from one context to another.

To build menu 110, a user may drag an icon 160 from the embedded browser window 150 to the menu 110. In screen shot 100, an icon 160 appears next to a "Location" field 170 in the embedded browser window 150. This icon 160 can be dragged into the upper pane 120 and dropped into the menu 110. The icon may act as an identifier of the web page that was navigated to in browser pane 150. In response to the drag-and-drop, the menu creation tool may insert a menu item entry and label for the dropped location. The label may be based, at least in part, on the browser page document title. The menu creation tool can pick up the URL of the page and store the URL against the newly created menu item so that when the menu item is clicked the browser will go to the associated page automatically. The drag-and-drop feature can be implemented, for example, by embedding a browser 150 or a frame within a larger frame that includes both the browser frame 150 and the menu creation tool frame 120. This configuration, which is made possible through browser extension functionality, may facilitate a drag-and-drop operation for the purpose of identifying content. Drag-and-drop may also be used for moving content and organizers into the menu structure being built.

In one example, the menu creation tool may operate within an Enterprise Browser Extension. Thus, an overarching functionality may be provided. The menu creation tool may therefore leverage the fact that it is working as an extension to the browser to do things that were not possible before. For example, the menu creation tool can put two frames together and have the content for one, or the representation for the content (e.g. an icon that is being dragged) actually dragged into another frame. Since the two frames are managed by the browser extension, the overarching functionality may include having access to browser metadata. Therefore, metadata associated with browser window 150 may be available to menu 110 in browser pane 120. Metadata associated with browser window 150 may be exposed to pane 120 by the browser extension. Therefore, the browser-based menu creation system can avail a user of their bookmarks, history, and other information in a browser-based URL repository.

Figure 2:
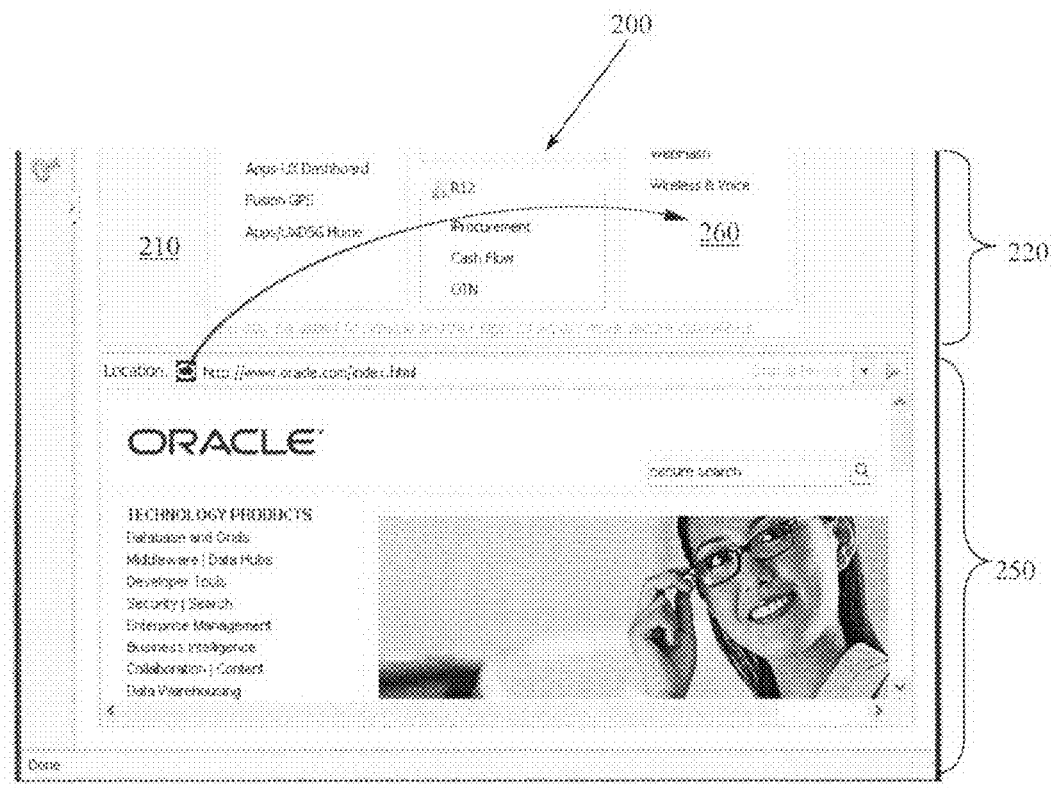
FIG. 2 is a simulated screen shot of a drag and drop operation associated with a browser-based menu creation system provided, at least in part, by a browser extension.

FIG. 2 illustrates a simulated screen shot 200 of a drag and drop operation being performed. The drag and drop operation may be associated with a browser-based menu creation tool provided, at least in part, by a browser extension. The drag and drop operation may be preceded by navigation in embedded browser window 250. Navigating to different sites may facilitate locating content to be added to menu 210. It may be desired to add the content to a specific location 260 in menu 210. Thus, the drag operation is illustrated beginning in pane 250 and ending at location 260 in pane 220. Once content has been identified in browser pane 250, information (e.g., icon, URL) associated with that content can be dragged to location 260 on menu 210. The menu tool creates a new item entry and fills in required information from the browser context from which the item has been dragged. This information may include a fully qualified pathname, a URL, a globally unique identifier (GUID), and other information associated with the content for which an entry has been placed in location 260. Conventionally, this information may not have been accessible through a drag and drop operation between panes because separate windows may have had operating system and/or browser enforced rules or policies concerning what could be moved between entities. The menu creation browser extension facilitates acquiring information from a first context (e.g., browser window 250) and providing it to a second context (e.g., menu 210 in window 220) through a single operation (e.g., drag and drop).

Figure 3:
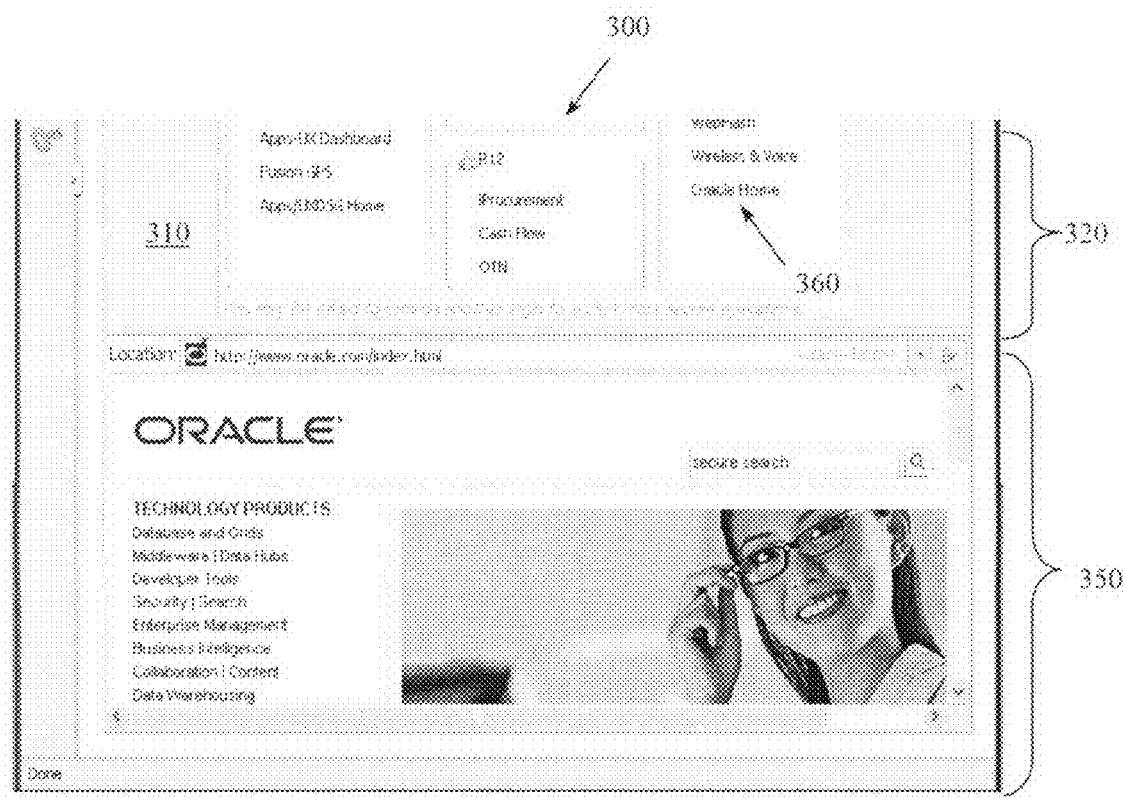
FIG. 3 is a simulated screen shot of the result of a drag and drop operation associated with a browser-based menu creation system provided, at least in part, by a browser extension.

FIG. 3 is a simulated screen shot 300 that shows the result of a drag and drop operation associated with a browser-based menu creation tool provided, at least in part, by a browser extension. FIG. 3 shows a newly created menu item "Oracle Home" 360 that has been added to menu 310 as the result of a drag and drop operation. The menu creation tool inserts the menu item 360 where the item (e.g., icon) from window 350 was dropped. A first set of data (e.g., title, icon) may be visually added to menu 310 while a second set of data (e.g., URL, permissions, metadata) may be added to data structures, objects, methods, and so on associated with menu 310. Conventionally this data may not have been directly acquirable by the data structures, objects, and so on associated with menu 310 because menu 310 and browser window 350 were separated by a digital divide enforced by an operating system, browser, or so on. Since menu 310, pane 320, and pane 350 are all either operably connected to and/or at least partially managed or provisioned by a single menu creation browser extension, this digital divide can be spanned.

Figure 4:
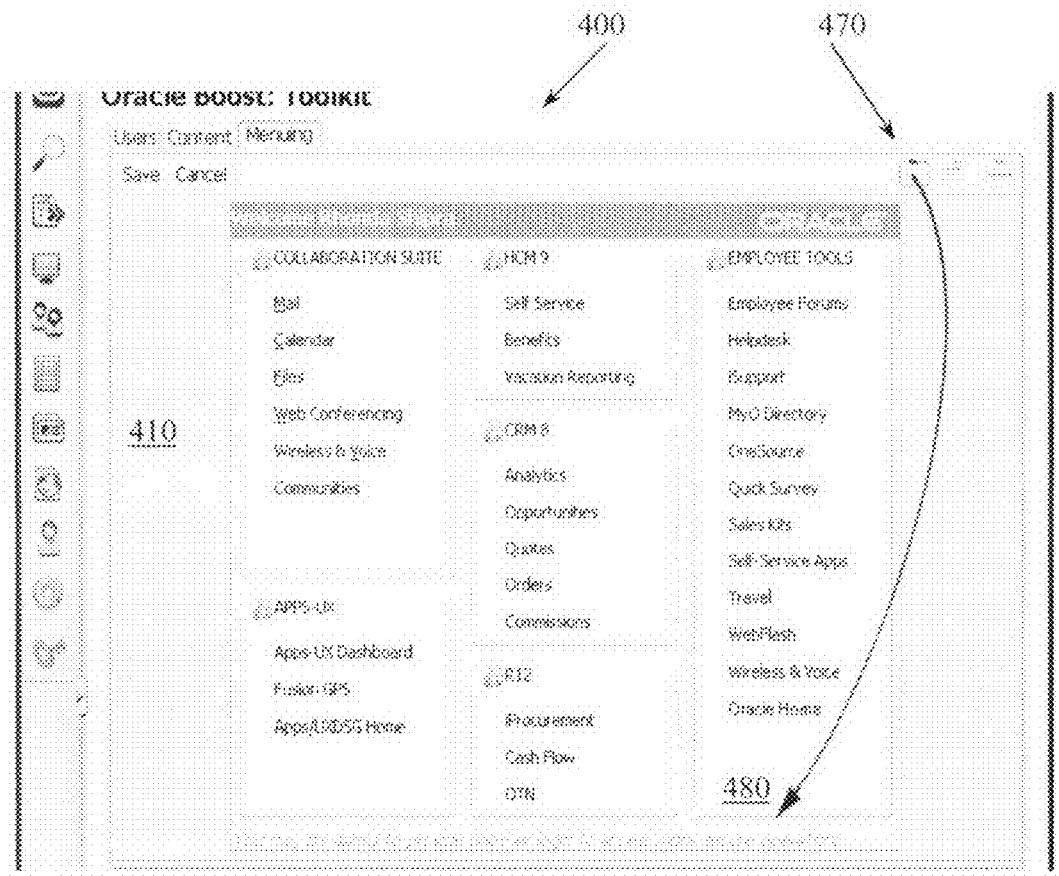
FIG. 4 is a simulated screen shot of a menu creation toolbar associated with content organization in a browser-based menu creation system provided, at least in part, by a browser extension.

FIG. 4 is a simulated screen shot 400 that illustrates a menu 410 being created. A toolbar 470 of icons facilitates organizing content in the menu 410 in a browser-based system. The toolbar 470 may be provided, at least in part, by a browser extension. The toolbar 470 facilitates building "infrastructure" for a menu system by facilitating placing organizing boxes, organizing lists, and so on using a drag and drop method. An item can be dragged from toolbar 470 to a location on menu 410. For example, an organization box can be dragged from toolbar 470 to location 480. Location 480 may then display the shell of an organizing box into which content may be dragged from a related navigating window. Once again the relocating (e.g., dragging) is facilitated by functionality provided, at least in part, by a browser extension.

Figure 5:
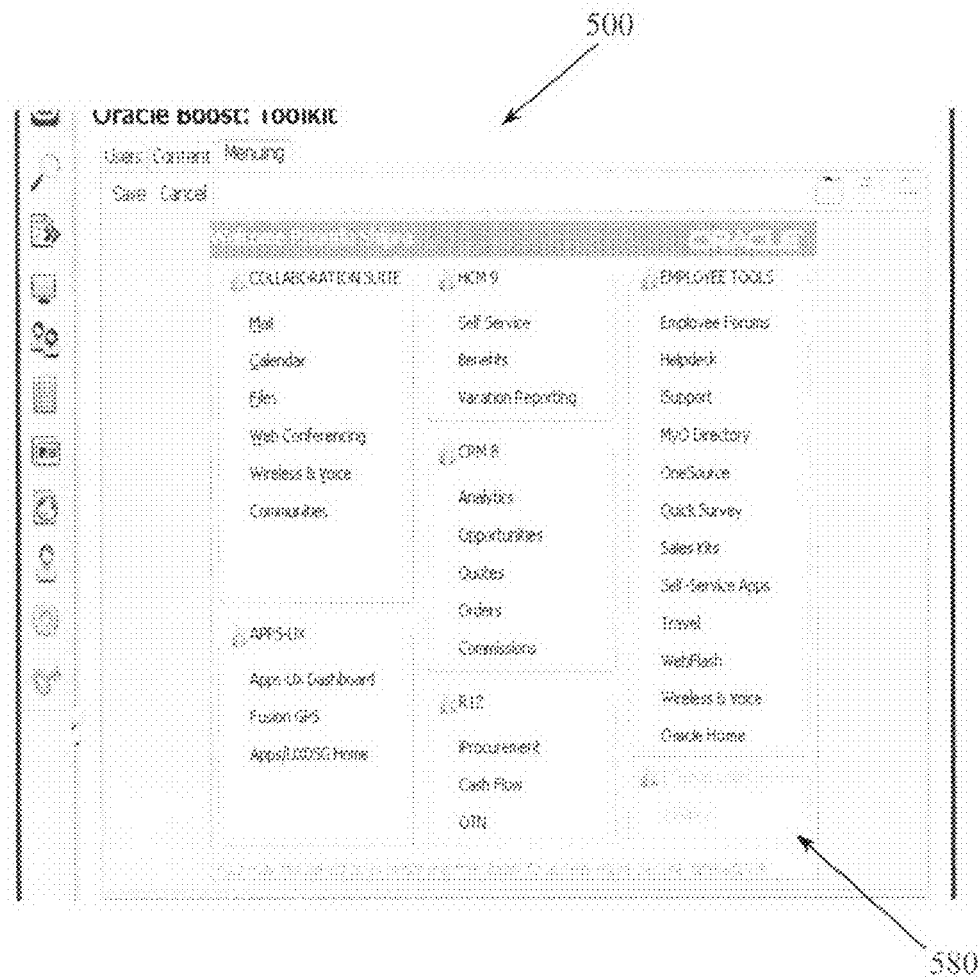
FIG. 5 is a simulated screen shot of the result of an action performed with a menu creation toolbar in a browser-based menu creation system provided, at least in part, by a browser extension.

FIG. 5 is a simulated screen shot 500 of the result of a menu creation toolbar action associated with content organization in a browser-based menu creation system provided, at least in part, by a browser extension. Thus, screen shot 500 includes the shell of an organization box 580. Organization box 580 may then be the target of a drag and drop operation where an item (e.g., icon, URL) from an associated navigation window (e.g., browser window) can be dropped.

Definitions

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software in execution, and/or a combination thereof. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device can read.

"Logic", as used herein, includes but is not limited to hardware, firmware, software in execution on a computing device, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms (e.g., routines, modules, methods, threads, programs) including separate applications or code from libraries (e.g., dynamically linked library (DLL)). Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated that computer-readable and/or executable instructions can be located in one logic and/or distributed between two or more communicating, co-operating, and/or parallel processing logics and thus may be loaded and/or executed in serial, parallel, massively parallel and other manners.

"User", as used herein, includes but is not limited to one or more persons, software components, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical transformations of physical quantities (e.g. change data values, change states of a component, etc). Usually, though not necessarily, the physical quantities take the form of electrical or magnetic signals capable of being stored, transferred, combined, compared, and otherwise manipulated in a logic and so on. It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, transmitting, retrieving, communicating, calculating, determining, displaying, and so on, refer to actions and processes of a computer system, logic, processor, or similar electronic device that manipulates and transforms data represented as physical (electronic) quantities.

Figure 6:
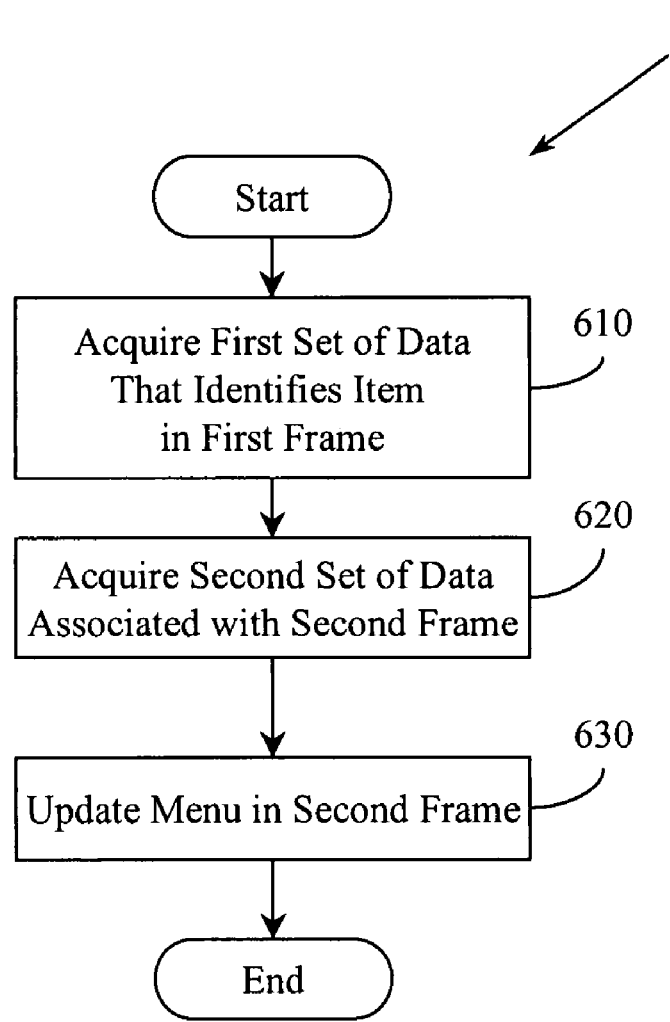
FIG. 6 illustrates an example method associated with browser-based menu creation provided by a browser extension.

FIG. 6 illustrates a computer-implemented method 600 associated with browser-based menu creation provided by a browser extension. Method 600 may include, at 610, controlling a browser extension to acquire a first set of information that uniquely identifies an item to be added to a menu. The first set of information may be acquired from a first frame. The menu to which the item is to be added may be associated with a second frame. Typically it may have been difficult, if possible at all, to span this digital divide using actions like a drag and drop action. Therefore, to facilitate frame-to-frame contextual sharing and/or data exchange, the method performed by the browser extension may manage and/or operably connect the first frame and the second frame. In one example, the first set of information may be acquired in response to a drag event performed in the first frame. For example, an identifier (e.g., icon, URL) associated with the item to be added may be dragged from the first frame. In one example, the first frame houses a browser window provided by the browser extension. This browser window may be configured to provide context to the second frame through the browser extension.

Method 600 may also include, at 620, controlling a browser extension to acquire a second set of information that uniquely identifies a location in the menu at which the item is to be added. The menu may be associated with a second frame and thus the second set of information may be acquired from the second frame. In one example, the second set of information may be acquired in response to a drop event performed in the second frame. For example, the drag operation that began in the first frame may conclude with a drop operation in the second frame. With the frame to frame contextual sharing facilitated by the browser extension method, first information gathered from the first frame may be processed in light of second information gathered from the second frame to update the menu.

Method 600 may also include, at 630, controlling the browser extension to add a representation of the added item to the menu at the specified location. In one example, adding the representation of the added item includes adding a graphical user interface entry to the menu. This graphical user interface entry may be configured to facilitate navigation to a web page associated with the item to be added. Thus, the graphical user interface item may be, for example, an icon, a label, a link, and so on. Adding the representation to the menu may be just one part of building the menu. Another part may include manipulating a data structure or data structures associated with the menu. For example, a data structure associated with the menu may be manipulated by inserting data that describes a visual attribute(s) associated of the representation of the item to be added. This data may include, for example, a label, a color, a font, a location, and so on. Additionally, updating the data structure associated with the menu may include inserting data that identifies the item to be added. This data may include, for example, a URL, a GUID, an icon, a hyperlink, and so on.

Figure 10:
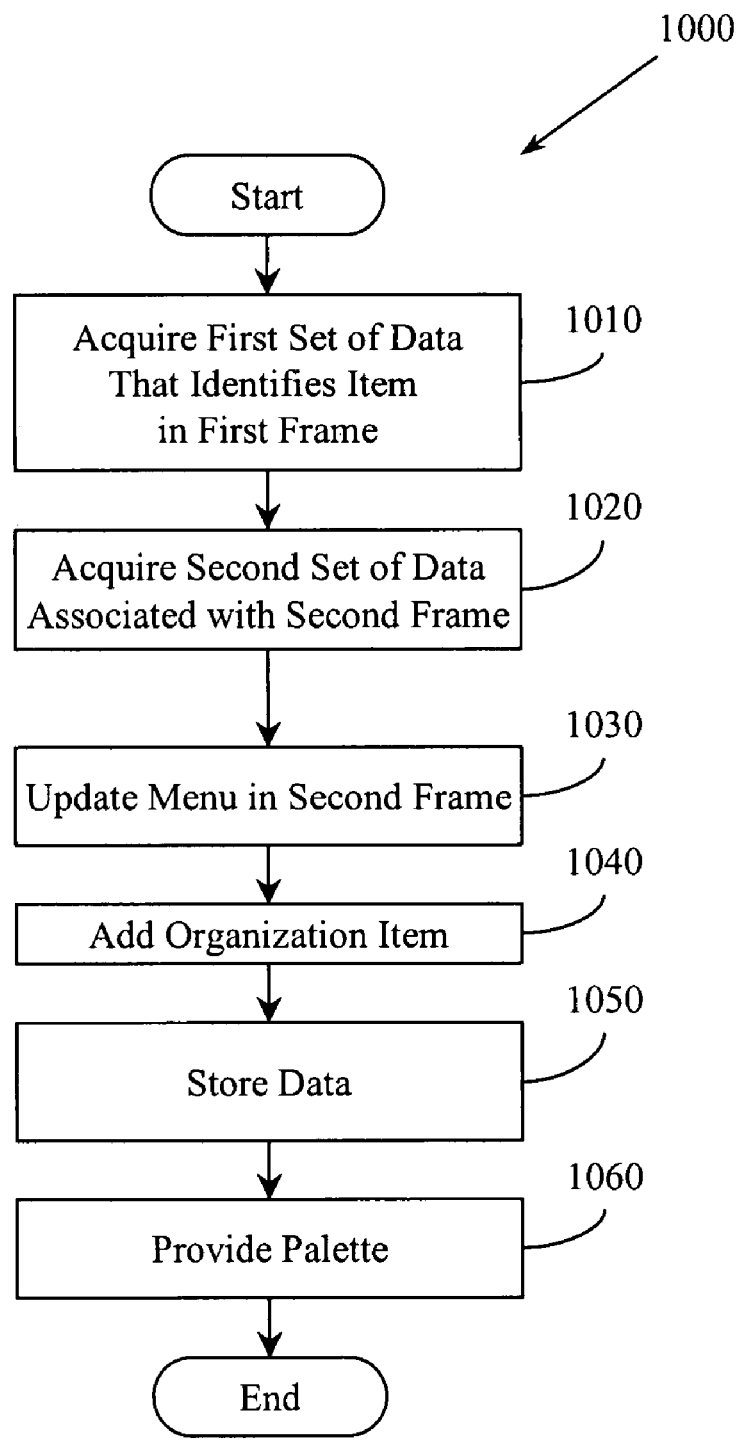
FIG. 10 illustrates an example method associated with browser-based menu creation provided by a browser extension.

FIG. 10 illustrates a method 1000 that includes some actions similar to method 600 (FIG. 6). For example, method 1000 includes, at 1010, controlling a browser extension to acquire a first set of information that uniquely identifies an item to be added to a menu. Method 1000 also includes, at 1020, controlling a browser extension to acquire a second set of information that uniquely identifies a location in the menu at which the item is to be added. Method 1000 also include, at 1030, controlling the browser extension to add a representation of the item to be added to the menu at the location in the menu.

However, method 1000 includes additional actions. For example, method 1000 may include, at 1040, controlling the browser extension to add an organization item to the menu. This organization item may be configured to group and/or organize items on and/or added to the menu. In one example, the organization item may be added in response to a drag and drop operation originating in a toolbar managed by the browser extension and terminating in the menu. The organization item may be, for example, a box that visually separates a set of items from other items, a drop down in which items can be hidden, a list, a radio box, and other organizing elements.

Method 1000 may also include, at 1050, controlling the browser extension to store data associated with the menu in a data store. For example, information sufficient to recreate the menu and to provide the functionality designed into the menu may be stored on disk, on a computer-readable medium, in a memory, and so on.

Figure 9:
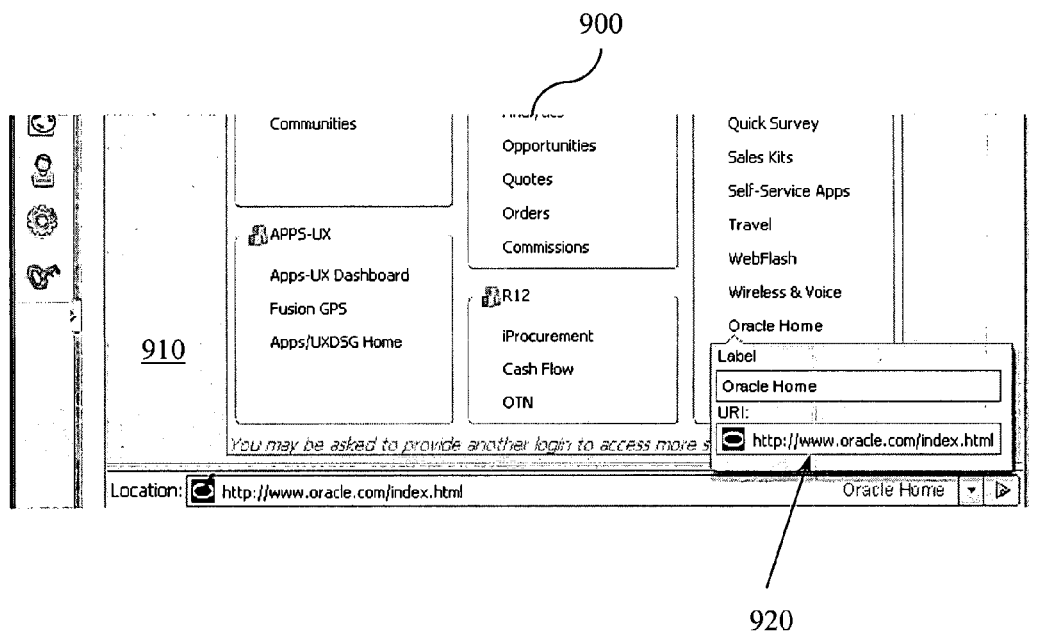
FIG. 9 is a simulated screen shot of a floating palette used to edit a menu entry.

A menu may be a dynamic thing. Therefore, method 1000 may also include, at 1060, controlling the browser extension to provide a floating palette configured to edit an item on the menu. The floating palette may have access to context associated with both the first frame and the second frame. An example floating palette is illustrated in FIG. 9.

Figure 7:
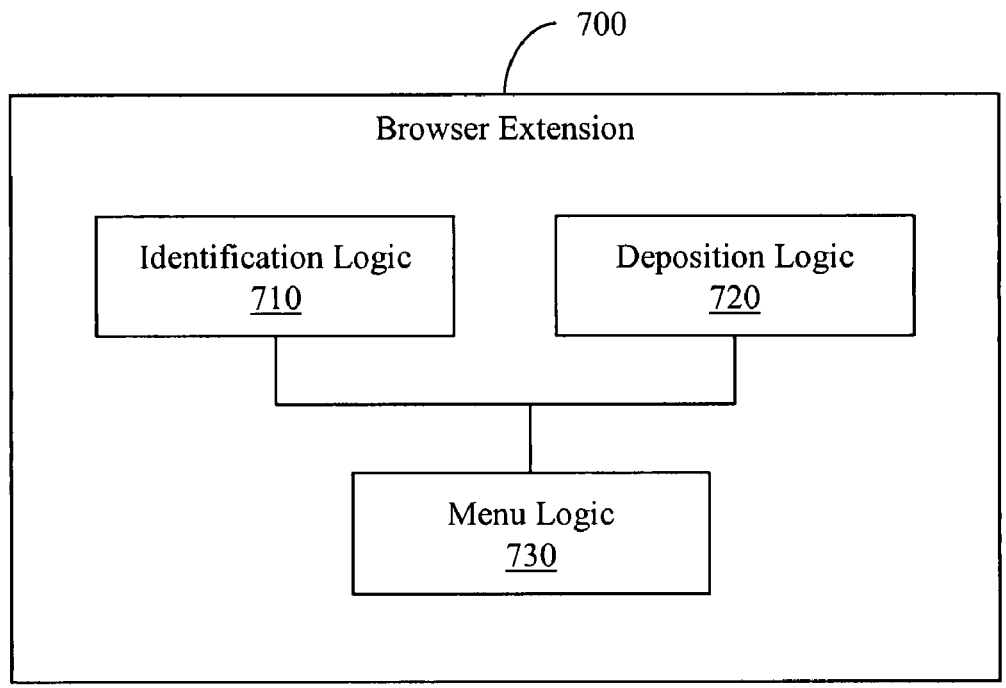
FIG. 7 illustrates an example browser extension associated with browser-based menu creation.

FIG. 7 illustrates an example browser extension 700. In one example, the browser extension 700 may be implemented in software and incorporated into a browser. Browser extension 700 may include an identification logic 710. Identification logic 710 may provide functionality to identify an item in a first frame. The item in the first frame may be added to a menu in a second frame. Browser extension 700 may be tasked with managing and/or providing, at least in part, both the first frame and the second frame. In one example, the menu to which the item is to be added may be manipulated by a browser-based menu tool also managed and/or provided by the browser extension 700. Browser extension 700 may have access to context associated with both the first frame and the second frame, which facilitates performing menu creation tasks using a drag and drop functionality not typically available between frames.

In one example, the identification logic 710 may provide a browser window to navigate to potential items to be added to the menu. In this example the browser window may be managed, at least in part, by the browser extension 700. Thus, in one example, the item to be added to the menu is associated with a web page navigated to by the browser window. For example, the item to be added to the menu may be an item that represents access to a web page. Therefore, the item to be added to the menu may be associated with an entity that is uniquely identified in the first frame. The unique identification may be provided by an icon, a hyperlink, a globally unique identifier (GUID), a uniform resource locator (URL), and so on. The unique identification may be performed in response to a drag event that begins in the first frame.

Browser extension 700 may also include a deposition logic 720 that provides functionality to identify a location in the menu to receive the item to be added. Recall that the item to be added to the menu may be identified in response to a drag action that moves an identifier from the first frame. Similarly, the location in the menu to receive the item to be added to the menu may be identified in response to a drop action that drops the identifier into the second frame. Thus, browser extension 700 may be configured to handle a drag and drop operation that begins (drag) in a first frame and that terminates (drop) in a second frame. Therefore, browser extension 700 may provide an identification logic 710 that may be configured to handle a drag event and a deposition logic 720 that may be configured to handle a related drop event.

Browser extension 700 may also include a menu logic 730 to provide functionality for adding the item to the menu. Adding the item to the menu may include visually updating the menu and updating a data structure associated with the menu. In one example, visually updating the menu includes changing the visual appearance of the menu in the second frame to include a representation of the item to be added. The representation may be, for example, an icon, a label, a link, and so on. In one example, updating the data structure associated with the menu may include storing a first set of data that describes a visual attribute(s) of the representation of the item. Visual attributes may include, for example, a label, a color, a font, a location, and so on. Updating the data structure may also include storing data that identifies the item to be added. This data may include, for example, a URL, a GUID, an icon, and a hyperlink. Updating the data structure may also include adding metadata that describes data added to the data structure. In one example, the menu logic 730 may provide a graphical user interface item in the second frame to facilitate actions including organizing the menu and providing a location into which the item to be added can be dropped, where the graphical user interface item can be positioned in the menu using a drag and drop functionality. In one example the menu logic 730 may fix data associated with the menu in a tangible medium (e.g., disk, computer-readable medium).

Figure 8:
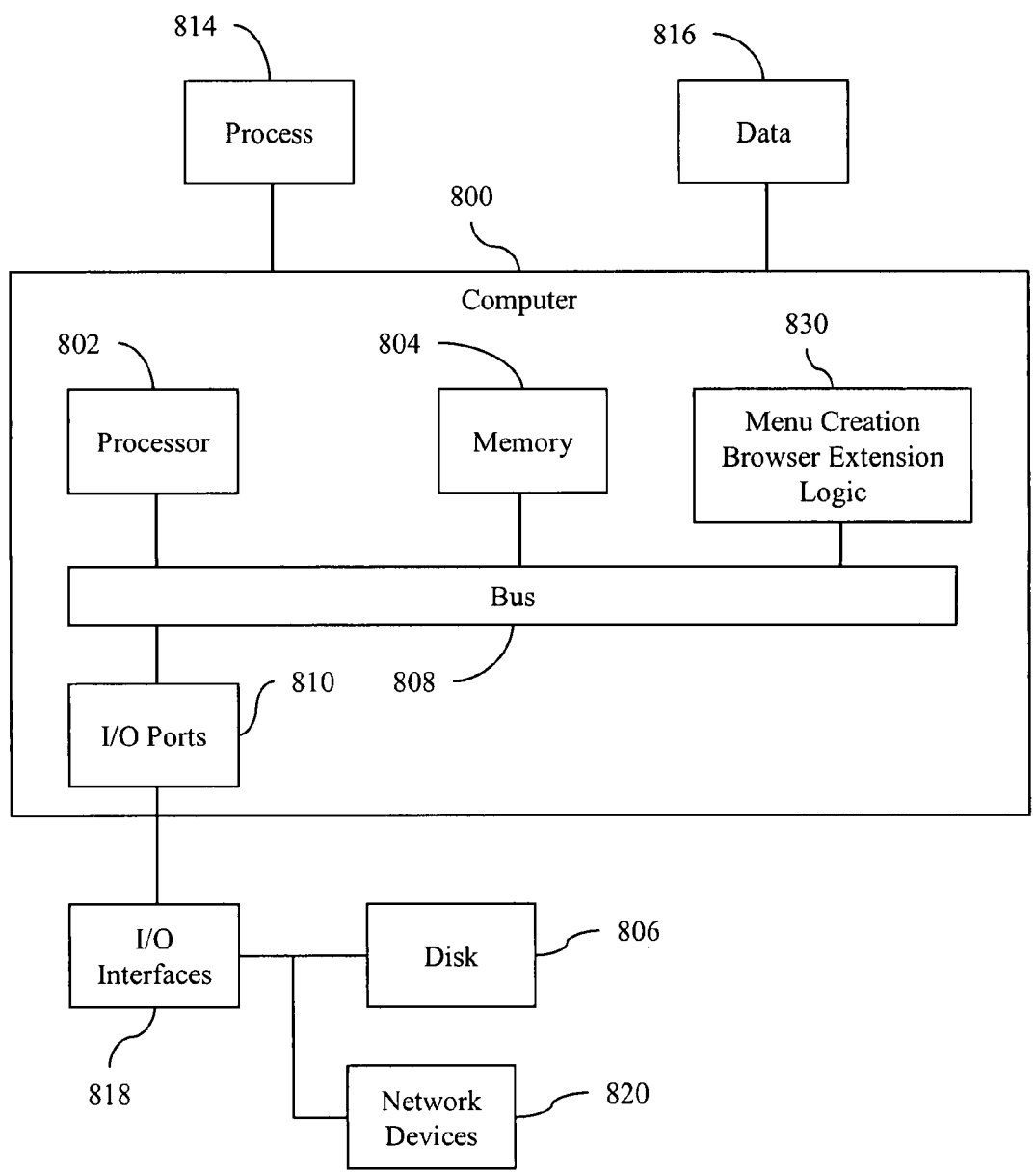
FIG. 8 illustrates an example computing device in which example systems and/or methods may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a menu creation browser extension logic 830 associated with providing a browser-based menu creation functionality. In different examples, the logic 830 may be implemented in hardware, software, firmware, and/or combinations thereof. Thus, the logic 830 may provide means (e.g., hardware, software, firmware) for identifying an item to be added to a menu. The item may be associated with a first frame and the menu may be associated with a second frame. To facilitate inter-frame contextual communication, both the first frame and the second frame may be accessible to and at least partially managed by the browser extension logic 830. Logic 830 may also provide means (e.g., hardware, software, firmware) for identifying a menu location for the item to be added. In one example, the menu location may be identified in response to a drop operation. Logic 830 may also provide means (e.g., hardware, software, firmware) for adding the item to the menu at the identified menu location using a drag and drop operation that originates in the first frame and terminates in the second frame. While the logic 830 is illustrated as a hardware component attached to the bus 808, it is to be appreciated that in one example, the logic 830 could be implemented in the processor 802.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, and/or a memory stick. Furthermore, the disk 806 may be a CD-ROM (compact disk ROM), a CD recordable drive (CD-R drive), a CD rewritable drive (CD-RW drive), and/or a digital video ROM drive (DVD ROM). The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., USB (universal serial bus), Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a local area network (LAN), a wide area network (WAN), and other networks.

FIG. 9 is a simulated screen shot 900 of a floating palette 920 used to edit an entry on a menu 910. The floating palette 920 may be provided by a browser extension. The entry may have been placed on the menu in response to a drag and drop action that originated in a first frame (e.g., embedded browser window) and that terminated in a second frame (e.g., menu creation tool). While the drag and drop operation may have employed information from both the first and second frame, the floating palette 920 may only need to access information associated with the second frame. The information may be associated with the second frame after the visual addition of a representation of an item to the menu and the updating of associated data structures in response to the drag and drop event.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium that stores processor executable instructions of a browser extension, the browser extension, comprising:
    an identification logic configured to, using a processor, identify in a first frame an item to be added to a menu in a second frame, the first frame and the second frame being managed, at least in part, by the browser extension, the menu being manipulated by a browser-based menu tool that has access to context associated with both the first frame and the second frame through the browser extension, where the first frame is a webpage browser page and the second frame is an embedded menu creation tool that is not a browser page, where the embedded menu creation tool is embodied locally on a device with the browser extension, and where the first frame and the second frame are connected in-line in a single browser pane, and where the first frame and the second frame are displayed concurrently in the single browser pane;
    a deposition logic configured to use at least the processor to identify a location in the menu to receive the item to be added; and
    a menu logic configured to use at least the processor to add the item to the menu, where adding the item to the menu includes visually updating the menu and updating a data structure associated with the menu, where the menu logic is configured to add an organization item to the menu in response to a drag and drop action moving an element from a toolbar of the menu into the menu in the second frame, where the organization item is a list structure, a box, a dropdown list, or a radio box, and where the organization item modifies a structure of the menu;
    where the menu logic is configured to control the browser extension to provide a floating palette configured to edit an item on the menu, where the floating palette has access to context associated with both the first frame and the second frame.

2. The browser extension of claim 1, where the identification logic is configured to provide a browser window for navigating to potential items to be added to the menu, the browser window being managed, at least in part, by the browser extension.

3. The browser extension of claim 2, where the menu logic is configured to add the item to the menu in response to a drag and drop operation that originates in the first frame and terminates in the second frame.

4. The browser extension of claim 3, where the item to be added to the menu is uniquely identified in the first frame by one or more of, an icon, a hyperlink, a globally unique identifier (GUID), and a uniform resource locator (URL).

5. The browser extension of claim 2, where the menu logic is configured to uniquely identify the item to be added to the menu in the first frame by information in a browser-based URL repository.

6. The browser extension of claim 1,
    where the item to be added to the menu is identified in response to a drag action that moves an identifier from the first frame, and
    where the location in the menu to receive the item to be added to the menu is identified in response to a drop action that drops the identifier into the second frame.

7. The browser extension of claim 1, where the menu logic is configured to visually update the menu including changing the visual appearance of the menu in the second frame to include a representation of the item to be added, and where the first frame and the second frame are connected in-line in a single browser pane.

8. The browser extension of claim 1, where the menu logic is configured to update the data structure associated with the menu, including storing in the data structure a first set of data that describes one or more visual attributes associated with the representation of the item to be added, where the first set of data includes one or more of, a label, a color, a font, and a location.

9. The browser extension of claim 1, where the menu logic is configured to update the data structure associated with the menu, including storing in the data structure a second set of data that identifies the item to be added, where the second set of data includes one or more of, a URL, a GUID, an icon, and a hyperlink.

10. The browser extension of claim 1, where the menu logic is configured to update the data structure associated with the menu, including adding metadata that describes data added to the data structure.

11. The browser extension of claim 1, where the menu logic provides a graphical user interface item in the second frame, where the graphical user interface item facilitates one or more of, organizing the menu, and providing a location into which the item to be added can be dropped, where the graphical user interface item can be positioned in the menu using a drag and drop functionality.

12. The browser extension of claim 1, where the menu logic is configured to fix data associated with the menu in a tangible medium.

13. A computer-implemented method, comprising:
    controlling, using a processor, a browser extension to acquire a first set of information that uniquely identifies an item to be added to a menu, where the first set of information is acquired from a first frame based on a user selection in the first frame;
    controlling the browser extension, using at least the processor, to acquire a second set of information that uniquely identifies a location in the menu at which the item is to be added, where the menu is associated with a second frame, where the second set of information is acquired from the second frame, where the second frame is an embedded menu creation tool that is not a browser page, where the embedded menu creation tool is embodied locally on a device with the browser extension, and where the first frame and the second frame are connected in-line in a single browser pane, and where the first frame and the second frame are displayed concurrently in the single browser pane;
    controlling the browser extension, using at least the processor, to add a representation of the item to be added to the menu at the location in the menu in response to a drag and drop operation that originates in the first frame and terminates in the second frame;
    where the browser extension manages, at least in part, both the first frame and the second frame;
    controlling the browser extension to add an organization item to the menu in response to a drag and drop action moving an element from a toolbar of the menu into the menu in the second frame, and where the organization item is a list structure, a box, a dropdown list, or a radio box, and where the organization item modifies a structure of the menu; and controlling the browser extension to provide a floating palette configured to edit an item on the menu where the floating palette has access to context associated with both the first frame and the second frame.

14. The method of claim 13, where the first set of information is acquired in response to a drag event performed in the first frame.

15. The method of claim 14, where the first frame is a browser window provided by the browser extension, the browser window being configured to provide context to the second frame through the browser extension and where the first frame and the second frame are displayed concurrently in a browser pane.

16. The method of claim 15, where the second set of information is acquired in response to a drop event performed in the second frame.

17. The method of claim 13, where the first set of information is acquired from a URL repository associated with the first frame.

18. The method of claim 16, where adding the representation of the item to be added includes adding a graphical user interface entry to the menu, where the graphical user interface entry is configured to facilitate navigation to a web page associated with the item to be added, and where adding the representation of the item to be added includes manipulating a data structure associated with the menu.

19. The method of claim 18, where manipulating the data structure associated with the menu includes inserting first data that describes one or more visual attributes associated with the representation of the item to be added, where the first data includes one or more of, a label, a color, a font, and a location.

20. The method of claim 19, where updating the data structure associated with the menu includes inserting second data that identifies the item to be added, where the second data includes one or more of, a URL, a GUID, an icon, and a hyperlink.

21. The method of claim 20, including controlling the browser extension to add an organization item to the menu, the organization item being configured to group and organize one or more items added to the menu, the organization item being added in response to a drag and drop operation originating in a toolbar managed by the browser extension and terminating in the menu.

22. The method of claim 18, including controlling the browser extension to store data associated with the menu in a data store.

23. A non-transitory computer-readable medium storing processor executable instruction that when executed by a device cause the device to perform a method, the method comprising:

identifying, by the device using at least a processor, an item to be added to a menu, the item being associated with a first frame, the menu being associated with a second frame, both the first frame and the second frame being accessible to and at least partially managed by a browser extension where the first frame includes a browser page and the second frame includes an embedded menu creation tool that is not a browser page, where the embedded menu creation tool is embodied locally on the device with the browser extension, and where the first frame and the second frame are connected in-line in a single browser pane, and where the first frame and the second frame are displayed concurrently in the single browser pane;

identifying, using at least the processor, a menu location for the item to be added;

adding, using at least the processor, the item to the menu at the menu location using a drag and drop operation that originates in the first frame and terminates in the second frame; and adding, using at least the processor, an organization item to the menu in response to a drag and drop action moving an element from a toolbar of the menu into the menu in the second frame, and where the organization item is a list structure, a box, a dropdown list, or a radio box, and where the organization item modifies a structure of the menu; and controlling at least the processor by the browser extension to provide a floating palette configured to edit an item on the menu, where the floating palette has access to context associated with both the first frame and the second frame.

* * * * *

UNITED STATES PATENT AND TRADEMARK OFFICE
CERTIFICATE OF CORRECTION

PATENT NO. : 8,370,766 B2
APPLICATION NO. : 11/980144
DATED : February 5, 2013
INVENTOR(S) : Selig Page 1 of 1

It is certified that error appears in the above-identified patent and that said Letters Patent is hereby corrected as shown below:

In the Specifications:

In column 1, line 6, delete "January 30," and insert -- January 30, 2007 --, therefor.

In column 6, line 34, delete "servelet," and insert -- servlet, --, therefor.

In the Claims:

In column 13, line 5, in Claim 13, delete "menu" and insert -- menu, --, therefor.

In column 14, line 31, in Claim 23, after "frame;" delete "and".

Signed and Sealed this
Seventh Day of May, 2013

Teresa Stanek Rea
*Acting Director of the United States Patent and Trademark Office*